Mar. 20, 1923.
J. J. ROHAN
1,448,817
CHILD'S VEHICLE
Filed Nov. 21, 1921
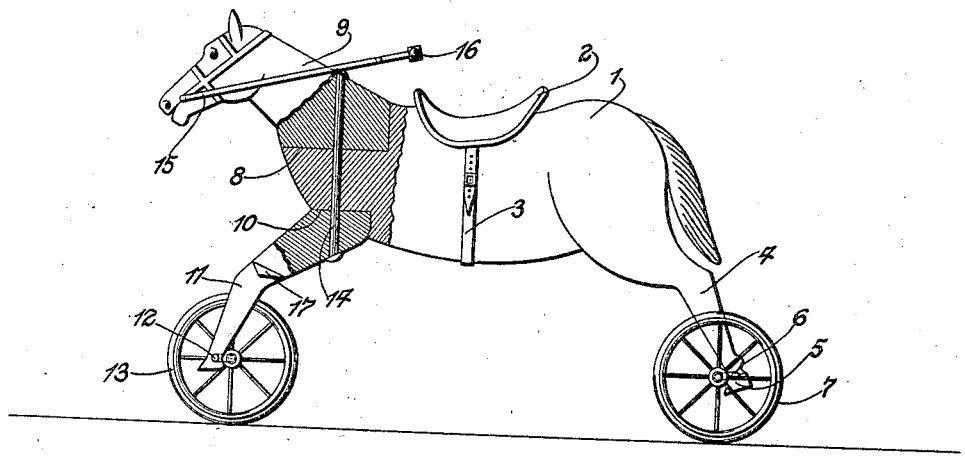
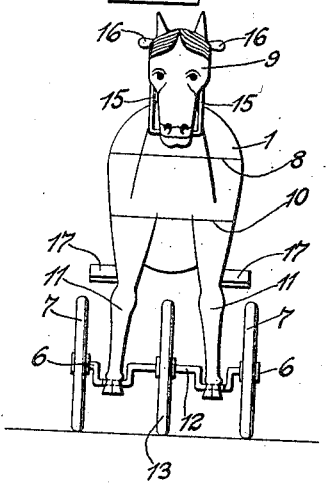 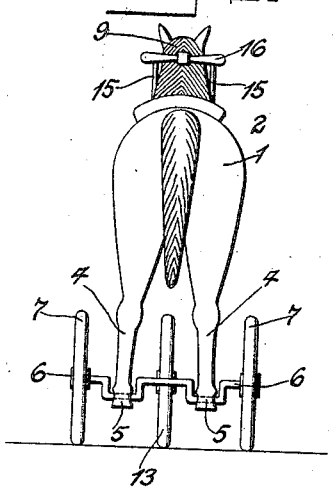
Inventor.
James J. Rohan,
by
His Attorneys.

Patented Mar. 20, 1923.

1,448,817

UNITED STATES PATENT OFFICE.

JAMES J. ROHAN, OF ST. LOUIS, MISSOURI, ASSIGNOR TO AUTO-BRONK, INC., OF ST. LOUIS, MISSOURI, A CORPORATION OF MISSOURI.

CHILD'S VEHICLE.

Application filed November 21, 1921. Serial No. 516,535.

*To all whom it may concern:*

Be it known that I, JAMES J. ROHAN, a citizen of the United States, residing at the city of St. Louis and State of Missouri, have invented a new and useful Child's Vehicle, of which the following is a specification.

This invention relates to improvements in child's vehicle, and consists in the novel construction hereinafter disclosed.

An object of the invention is to provide a child's vehicle including a body portion mounted on eccentric running gear, whereby the longitudinal movement of the vehicle will impart a vertical reciprocating motion to both the front and rear supports of the body.

Another object of the invention is to provide a child's vehicle of the class described having novel means for guiding the vehicle, said means including a reversible bail whereby the vehicle may be guided in one position and drawn in another position.

Additional advantages of the construction will be apparent from the following detailed description taken in connection with the accompanying drawing, in which—

Fig. 1 is a side elevation of the vehicle with a portion in section.

Fig. 2 is a front elevation.

Fig. 3 is a rear elevation.

In the embodiment of the invention illustrated in the drawing the body portion 1 is formed in simulation of a hobby horse body, although it will be clearly understood that the body may be of different shape, if desired. In the embodiment shown a saddle or seat 2 is secured to the body portion 1 by a strap 3, thereby providing a convenient support for the operator of the vehicle.

Extending rearwardly and downwardly in parallel alinement rear supports 4, taking the form of the rear legs of the body of the hobby horse, are provided. Near the lower extremities of the supports 4 are bearings 5 in which is mounted a double wrist axle 6, carrying at each extremity a wheel 7 thereby providing an eccentric mounting for the rear wheels of the vehicle.

At the forward portion of the body of the vehicle is a recess 8 in which is mounted an arm 9 taking the form of the head and neck of the hobby horse. Below the recess 8 is a second recess 10 in which is mounted a front support 11 in the form of the front legs of the hobby horse. Intermediate the two arms of the support is mounted a wrist axle 12 which supports a wheel 13.

The front support and the arm 9 are mounted on a pivot pin 14 that extends through a mounting formed by the portion between the recesses 8 and 10 so that by movement of the arm 9 the front support and thereby the front wheel may be guided.

A handle in the form of a bail 15 is pivoted near the forward end of the arm 9, said bail extending backwardly to a point adjacent to the seat or saddle 2 and having a lateral extension 16. The bail is arranged to swing over the arm 9 so that it may be placed in two positions, one where it may be manipulated by the operator of the vehicle seated on the saddle 2, and another where it may be swung forwardly of the arm 9 for drawing the vehicle.

Stirrups or foot rests 17 are provided on the outside of the two arms of the front support, so that when the vehicle is coasting the feet of the operator may be rested upon said supports and thereby assist in guiding the direction of the vehicle.

It is understood that the vehicle may be propelled on an even or upwardly inclined surface by the feet of the operator extending downwardly from the body of the vehicle.

It is obvious from the foregoing description that as the vehicle is propelled or moves in a longitudinal direction there will be imparted to the vehicle a rocking motion, due to the eccentric mounting of the wheels in the front and rear support thereof. This double oscillation of both the front and rear support imparts a sensation to the rider of the vehicle that is interesting and pleasing, lending novelty to the structure.

I am aware that the invention may be modified in certain particulars without departing from the spirit and scope of the invention. I do not limit myself therefore to the exact construction and arrangement shown and described, but what I claim and desire to secure by Letters Patent is:—

1. A vehicle, comprising a rear axle, two wheels rigid on the rear axle, cranks on the rear axle between said two wheels, a body, two downward extensions rigid with the rear portion of the body connected with the cranks on the rear axle, a front axle, a crank on each end of the front axle, a single front wheel rigid with the front axle between said cranks, a pair of supporting legs having their lower ends pivoted to the cranks on the front axle and having their upper ends under the upper portion of the body to support the body, a vertical pivot device holding said two legs in connection with the body, and a part in connection with said pivot device above the forward end of the body for turning said two legs and thereby said front wheel to steer the vehicle.

2. A vehicle, comprising a body, a pair of legs rigid with the rear end of the body, a pair of legs pivoted to the forward end of the body for lateral turning movements relative to the body, and a device above the forward end of the body for turning said legs at the forward end of the body laterally in either direction relative to the body; in combination with a running gear supporting the body and for raising and lowering the body equally throughout its entire length when the running gear is in motion, comprising a rear axle, two wheels rigid on the rear axle, cranks on the rear axle between said two wheels pivotally connected with the lower ends of the first-named legs, a front axle, a crank on each end of the front axle, and a single front wheel rigid on the front axle between said two cranks on the front axle.

JAMES J. ROHAN.